March 25, 1952  H. MARCHADOUR  2,590,556
MEASURING AND BOX FILLING MACHINE
Filed June 2, 1947  2 SHEETS—SHEET 1
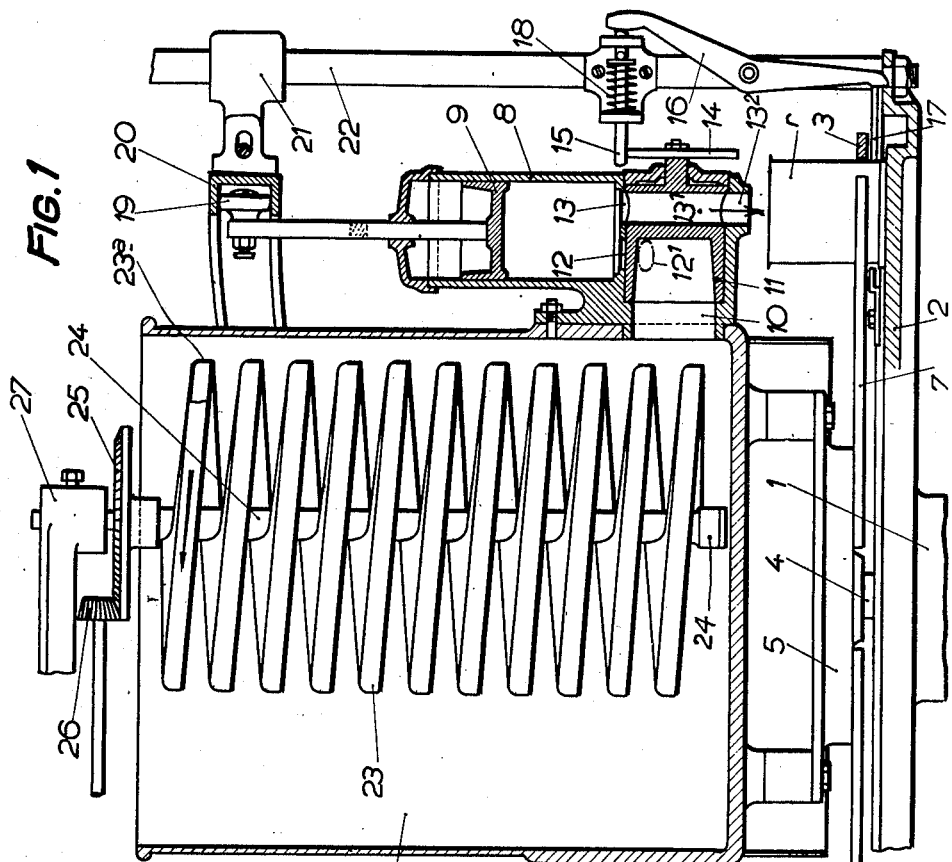
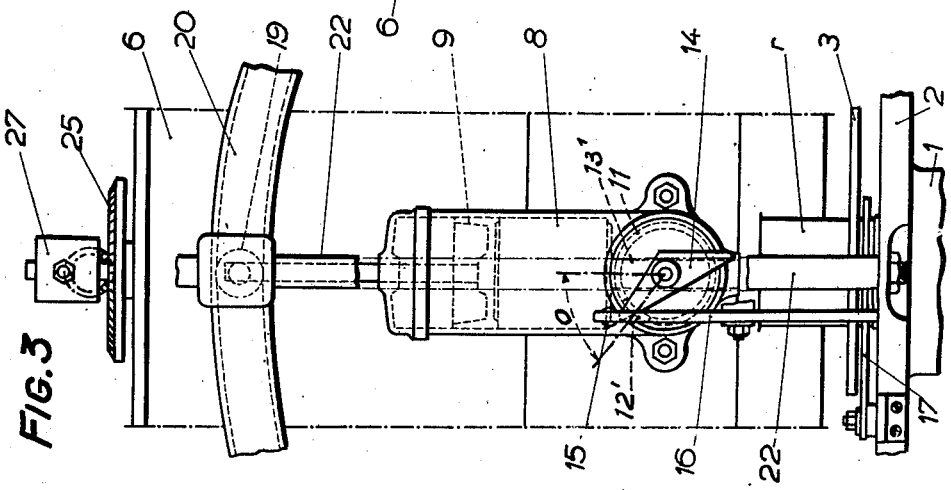

Patented Mar. 25, 1952

2,590,556

UNITED STATES PATENT OFFICE 2,590,556

MEASURING AND BOX FILLING MACHINE

Henri Marchadour, Quimper, France

Application June 2, 1947, Serial No. 751,817
In France March 26, 1943

Section 1, Public Law 690, August 8, 1946
Patent expires March 26, 1963

7 Claims. (Cl. 226—19)

The present invention has for its object a measuring and box filling machine for filling containers with preserves of pure fruit and sugar, said machine being chiefly characterised by the fact that it effects the filling with a regular proportion of whole fruit and syrup. While this machine is specially adapted for the above defined purpose, it can be used also advantageously for filling containers with homogeneous liquid or semi-liquid products.

The machine according to the invention is principally characterised by the fact that it comprises a rotary reservoir adapted to receive the product to be filled into the boxes, measuring distributors acting by aspiration and expulsion ranged on the circumference of said reservoir and rotating with the latter, means for establishing communication, at each revolution, between the capacity of each of said distributors alternatively with a corresponding lateral opening formed in the lower part of said reservoir and with an outlet opening for the container to be filled which is moved around the reservoir at the same angular speed, and a conveyor screw having a vertical axis and rotating inside said reservoir, in opposite direction, so that the turns of said screw convey the fruits which float at the surface of the product to the lower part of said reservoir where the lateral openings feeding said distributors are formed, so that the fruits are aspirated into said distributors together with the syrup.

The turns of the screw are preferably formed of a metal sheet having a downwardly directed peripheral rim which impedes the escape of the conveyed fruits during their downward travel.

The accompanying drawings show by way of example an embodiment of the machine according to the invention.

Fig. 1 is a partial vertical section of the machine, partly in elevation.

Fig. 3 is a partial side elevation of the same.

Figure 2:
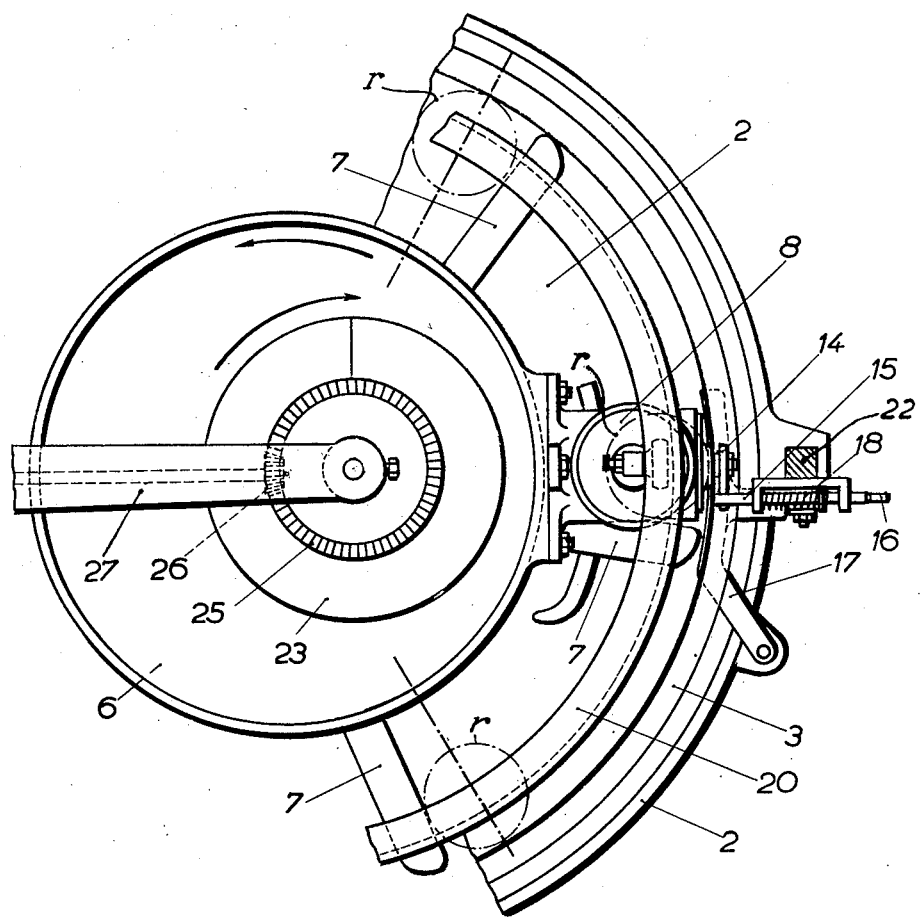
Fig. 2 is a plan view of the machine.

The machine comprises a frame 1 on which is mounted a circular plate 2 serving as a slide for the containers r to be filled, which are led by a guide 3 so as to follow a circular path.

The plate 2 is traversed at its center by a vertical shaft 4 which is rotated by any convenient means and carries a small plate 5 upon which rests a reservoir 6 adapted to receive the product to be filled into boxes or other containers, for example a preserve comprising a mixture of fruits and syrup. Under the small plate 5 are mounted, for example, six arms 7 adapted to push the containers r.

On the external wall of the reservoir 6, near its base, are mounted pumps or measuring distributors 8 acting by aspiration and expulsion, their number being equal to that of the arms 7.

Each of these distributors comprises a vertical cylinder 8 in which is movable a piston 9, and a horizontal cylinder 10 opening into the reservoir 6, a rotary cock 11 being mounted in said horizontal cylinder 10. The base of the vertical cylinder 8 is formed with two openings 12 and 13 adapted to register respectively with two openings $12^1$ and $13^1$ of the cock which are displaced with respect to one another by the angle O (Fig. 3).

The cock 11 carries externally a double-armed lever 14 adapted to be pushed to the position shown in Fig. 3, in which the cock is placed as shown in Fig. 1, by a finger 15 which can be brought to project into the path of said lever 14 by another lever 16 adapted to rock under the action of a cam 17, when the latter is angularly displaced by a container r arriving in front of the discharge opening $13^2$. This movement is effected, as it will appear hereafter, when the piston 9 reaches its upper dead center. The finger 15 is provided with a return spring 18 which draws said finger 15 as well as the lever 16 back as soon as the container r passes beyond the cam 17. On the opposite side of the plate 2 is mounted, in the path of the lower arm of the lever 14, a fixed finger (not shown) adapted to rock said lever 14 in the opposite direction, so as to return it to its initial position, wherein the cylinder 8 of the measuring distributor communicates with the reservoir 6 through the openings 12, $12^1$ and 10.

The piston 9 has a rod which is square, to avoid rotation and carries at its upper end a freely rotatable roller 19 engaged in a fixed circular guideway 20 surrounding the container.

This guideway is pivotally mounted, on the side where the containers are removed, at a height corresponding to the lower dead center of the pistons. On the diametrally opposed side, which is shown on Fig. 1, said guideway 20 is mounted so as to be adjustable in height, for example by means of a slide 21 which is movable on a vertical bar 22 carrying also the finger 15 and lever 16. The difference between the levels of the highest and lowest point of the guideway 20 determines the stroke of the pistons 9 of the pumps 8 and consequently the quantity of product to be filled into each container r.

In the reservoir 6 is mounted a conveyor screw 23 which is independent of said reservoir 6. This screw has a diameter inferior to that of the reservoir and its vertical axis is displaced with respect to the axis of the reservoir, to the side where the pumps of the distributors effect their aspiration stroke, for example towards the end of said stroke, as shown in Figs. 1 and 2. The turns of the screw are formed of a metal sheet having a downwardly directed peripheral rim 23a adapted to engage the fruits floating on the syrup and to hold them while they are conveyed downwards, to the bottom of the reservoir, the screw rotating to this effect in a direction opposite to the direction of rotation of the reservoir. In the shown example, the reservoir 6 rotates in an anti-clockwise direction, the screw 23 is threaded to the left and rotates clockwise. The axis 24 of the screw is connected to a bevel gear 25 driven by a bevel pinion 26 and is mounted on a supporting arm 27.

The machine according to the invention operates as follows:

At the start, the cocks 11 of all the distributors 8 are in the position in which the opening 12' registers with the opening 12 so that said distributors communicate with the reservoir 6 which is filled with product, the openings 13¹ being consequently closed. The screw 23 rotating in a direction opposite to the reservoir and at higher speed engages a part of the fruits floating on the syrup and compels them to descend to the bottom of the reservoir. A part of said fruits, which are near the openings 10, are aspirated into the same, while other fruits are allowed to escape and to return to the surface. As long as no container r is placed on the machine, under the pumps 8, the latter expel the aspirated mixture of fruits and syrup back into the reservoir.

By a feeding device which does not form part of this invention, containers r are now brought one by one upon the plate 2, under the pumps 8, which they follow in their circular movement by sliding on the plate under the action of the arms 7. Each time one of the pistons 9 arrives near to its upper dead center, the corresponding container r acts upon the cam 17 which, through the lever 16, places the finger 15 into the path of the upper arm of the lever 14. As the distributor carrying the axis of the lever 14 advances, the lever 14 is inclined to the left (Fig. 3) until it is able to pass under the finger 15 and continues its travel in the new position in which the cock 11 has been rotated so that the distributor 8 communicates through the openings 13 and 13¹ with the discharge opening 13², while the inlet opening 12¹ is closed. At this moment starts the filling of the container r, as the piston descends, the filling being terminated when the piston reaches its lower dead center. The fixed finger (not shown) mounted at the point then occupied by the distributor then turns the lever 14 in the opposite direction and thereby brings the cock 11 back to its initial position. The operation is repeated for each distributor 8 and for each container r.

It will be understood that the above described embodiment has been given by way of example only, and that various modifications may be made therein without departing from the scope of the invention.

I claim:

1. A measuring and container-filling machine for a mixture of solid and liquid products such as preserves of fruit in a syrup, comprising a rotary reservoir formed with lateral outlet openings in the lower part of the peripheral wall thereof, distributing means connected to each of said lateral outlet opening and operable at each revolution of said reservoir for withdrawing a quantity of the contents of said reservoir through one of said lateral openings and expelling said quantity through a discharge opening into a container to be filled, a vertical conveyor screw mounted in said reservoir, in spaced relation to the peripheral wall thereof, extending from above the level of the mixture in said reservoir down to the level of said lateral outlet openings, and means for rotating said conveyor screw in a direction opposite to the direction of rotation of said reservoir, so as to cause a circulation of the solid products floating on the surface of the contents of said reservoir toward the lower part of said reservoir.

2. A measuring and container-filling machine for a mixture of solid and liquid products such as preserves of fruit in a syrup, comprising a rotary reservoir having a plurality of lateral outlet openings in the lower part of the peripheral wall thereof; distributing means connected to each of said lateral outlet openings and operable at each revolution of said reservoir for withdrawing a quantity of the contents of said reservoir through one of said lateral outlet openings and expelling said quantity through a discharge opening into a container to be filled; a vertical conveyor screw mounted in said reservoir, in spaced relation to the peripheral wall thereof, extending from above the level of the mixture in said reservoir down to the level of said lateral outlet openings; a downwardly directed peripherical rim on said conveyor screw; and means for rotating said conveyor screw in a direction opposite to the direction of rotation of said reservoir, so as to cause a circulation of the solid products floating on the surface of the contents of said reservoir toward the lower part of said reservoir.

3. A measuring and container-filling machine for a mixture of solid and liquid products such as preserves of fruit in a syrup, comprising a rotary reservoir having a plurality of lateral outlet openings in the lower part of the peripheral wall thereof; distributing means connected to each of said lateral outlet openings and operable at each revolution of said reservoir for withdrawing a quantity of the contents of said reservoir through one of said lateral outlet openings and expelling said quantity through a discharge opening into a container to be filled; a vertical conveyor screw mounted in said reservoir, in spaced relation to the peripheral wall thereof, extending from above the level of the mixture in said reservoir down to the level of said lateral outlet openings, said conveyor screw having a shaft being arranged eccentrically in said reservoir toward the side thereof where said distributing means effect the withdrawing stroke thereof, and means for rotating said conveyor screw in a direction opposite to the direction of rotation of said reservoir, so as to cause a circulation of the solid products floating on the surface of the contents of said reservoir toward the lower part of said reservoir.

4. A dispensing machine for dispensing a mixture of liquid and solid products such as preserves of fruits in a syrup, comprising in combination a reservoir rotatable about a vertical axis; means for rotating said reservoir about said vertical axis in one direction; at least one lateral outlet opening in the lower part of said reservoir; means for opening said outlet opening for a predetermined time period each time it reaches a predetermined position during rotation of said reservoir; a vertically extending conveyor screw rotatable about a vertical axis and arranged within said reservoir extending substantially from the level of said lateral outlet opening in upward direction and shaped so as to be adapted to guide during its rotation said solid products in said liquid from the upper to the lower part thereof; and means for rotating said conveyor screw in a direction opposite to the direction of rotation of said reservoir so as to cause by the combined action of the current in the liquid created by rotation of said reservoir and rotation of said conveyor screw said solid products to be conveyed by said conveyor screw from the upper to the lower part of said reservoir into the region of said outlet opening.

5. A dispensing machine for dispensing a mixture of liquid and solid products such as preserves of fruits in a syrup, comprising in combination a reservoir rotatable about a vertical axis; means for rotating said reservoir about said vertical axis in one direction; at least one lateral outlet opening in the lower part of said reservoir; means for opening said oulet opening for a predetermined time period each time it reaches a predetermined position during rotation of said reservoir; a vertically extending conveyor screw rotatable about a vertical axis and arranged within said reservoir extending substantially from the level of said lateral outlet opening in upward direction; a downwardly extending rim, along the outer edge of said vertically extending conveyor screw shaped so as to hold said solid products within said conveyor screw; and means for rotating said conveyor screw in a direction opposite to the direction of rotation of said reservoir so as to cause by the combined action of the current in the liquid created by rotation of said reservoir and rotation of said conveyor screw said solid products to be conveyed by said conveyor screw from the upper to the lower part of said reservoir into the region of said outlet opening.

6. A dispensing machine for dispensing a mixture of liquid and solid products such as preserves of fruits in a syrup, comprising in combination a reservoir rotatable about a vertical axis; means for rotating said reservoir about said vertical axis in one direction; at least one lateral outlet opening in the lower part of said reservoir; means for uncovering said outlet opening for a predetermined time period each time it reaches a predetermined position during rotation of said reservoir; a vertically extending conveyor screw rotatable about a vertical axis and arranged within said reservoir eccentrically so that its bottom end is located near said lateral outlet opening in said peripheral wall when the same is uncovered by said means for uncovering said outlet opening and extending in upward direction so as to be adapted to guide during its rotation said solid products in said liquid from the upper to the lower part thereof; and means for rotating said conveyor screw in a direction opposite to the direction of rotation of said reservoir so as to cause by the combined action of the current in the liquid created by rotation of said reservoir and rotation of said conveyor screw said solid products to be conveyed by said conveyor screw from the upper to the lower part of said reservoir into the region of said outlet opening.

7. A dispensing machine for dispensing a mixture of liquid and solid products such as preserves of fruits in a syrup, comprising in combination a reservoir rotatable about a vertical axis; means for rotating said reservoir about said vertical axis in one direction; at least one lateral outlet opening in the lower part of said reservoir; means for uncovering said outlet opening for a predetermined time period each time it reaches a predetermined position during rotation of said reservoir; a vertically extending conveyor screw rotatable about a vertical axis and arranged within said reservoir eccentrically so that its bottom end is located near said lateral outlet opening in said peripheral wall when the same is uncovered by said means for uncovering said outlet opening; a downwardly extending rim along the outer edge of said vertically extending conveyor screw shaped so as to hold said solid products within said conveyor screw; and means for rotating said conveyor screw in a direction opposite to the direction of rotation of said reservoir so as to cause by the combined action of the current in the liquid created by rotation of said reservoir and rotation of said conveyor screw said solid products to be conveyed by said conveyor screw from the upper to the lower part of said reservoir into the region of said outlet open.

HENRI MARCHADOUR.

REFERENCES CITED

The following references are of record in the file of this patent:

UNITED STATES PATENTS

| Number | Name | Date |
| --- | --- | --- |
| 365,451 | Syme | June 28, 1887 |
| 956,285 | Champ | Apr. 26, 1910 |
| 1,080,469 | Murray | Dec. 2, 1913 |
| 1,254,190 | Baker | Jan. 22, 1918 |
| 2,115,335 | Keck et al. | Apr. 26, 1938 |
| 2,127,777 | Kunzi | Aug. 23, 1938 |
| 2,145,765 | Huntley | Jan. 31, 1939 |
| 2,187,332 | Sinz | Jan. 16, 1940 |
| 2,321,994 | Chapman | June 15, 1943 |
| 2,330,862 | Bleam | Oct. 5, 1943 |

FOREIGN PATENTS

| Number | Country | Date |
| --- | --- | --- |
| 483,706 | France | Mar. 29, 1921 |